US010417174B2

(12) United States Patent
Ranadive et al.

(10) Patent No.: US 10,417,174 B2
(45) Date of Patent: Sep. 17, 2019

(54) REMOTE DIRECT MEMORY ACCESS IN A VIRTUALIZED COMPUTING ENVIRONMENT

(71) Applicant: VMware, Inc., Palo Alto, CA (US)

(72) Inventors: Adit Ranadive, Sunnyvale, CA (US); Aditya Sarwade, Palo Alto, CA (US); Andy King, San Jose, CA (US); Jorgen Hansen, Palo Alto, CA (US); Bhavesh Davda, Fremont, CA (US); George Zhang, Palo Alto, CA (US); Xiaoyun Gong, Cupertino, CA (US)

(73) Assignee: VMware, Inc., Mountain View, CA (US)

( * ) Notice: Subject to any disclaimer, the term of this patent is extended or adjusted under 35 U.S.C. 154(b) by 40 days.

(21) Appl. No.: 15/192,168

(22) Filed: Jun. 24, 2016

(65) Prior Publication Data

US 2017/0371835 A1    Dec. 28, 2017

(51) Int. Cl.
*G06F 15/173* (2006.01)
*G06F 9/455* (2018.01)
*G06F 9/54* (2006.01)

(52) U.S. Cl.
CPC .... *G06F 15/17331* (2013.01); *G06F 9/45558* (2013.01); *G06F 9/544* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2003/0204593 A1* | 10/2003 | Brown | H04L 41/0816 709/225 |
| 2008/0148295 A1* | 6/2008 | Freimuth | G06F 9/4856 719/324 |
| 2008/0189432 A1* | 8/2008 | Abali | G06F 9/4856 709/238 |
| 2008/0222375 A1* | 9/2008 | Kotsovinos | G06F 9/5083 711/162 |
| 2010/0199276 A1* | 8/2010 | Umbehocker | G06F 3/0604 718/1 |
| 2011/0225285 A1* | 9/2011 | Patel | G06F 9/4856 709/224 |

(Continued)

*Primary Examiner* — Scott B Christensen
(74) *Attorney, Agent, or Firm* — Patterson + Sheridan, LLP (57) ABSTRACT

A method of managing remote direct memory access (RDMA) to a virtual computing instance includes suspending locally initiated RDMA operations of the virtual computing instance executing on a first host prior to a migration of the virtual computing instance to a second host. The first host includes a first hypervisor and the second host includes a second hypervisor. The method further includes requesting a peer to suspend remotely initiated RDMA operations that target the virtual computing instance through a first channel, establishing after the migration, a second channel between the peer and the second hypervisor that supports execution of the virtual computing instance on the second host, configuring a virtual object of the second hypervisor on the second host to use the second channel for the locally initiated RDMA operations, and requesting the peer to resume the remotely initiated RDMA operations using the second channel.

24 Claims, 7 Drawing Sheets

(56) References Cited

U.S. PATENT DOCUMENTS

| | | | |
|---|---|---|---|
| 2012/0054367 A1* | 3/2012 | Ramakrishnan | G06F 9/4856 709/242 |
| 2013/0110959 A1* | 5/2013 | Sharp | G06F 9/5016 709/212 |
| 2013/0138791 A1* | 5/2013 | Thomas | H04L 67/02 709/223 |
| 2014/0297775 A1* | 10/2014 | Davda | G06F 13/28 709/212 |
| 2014/0359144 A1* | 12/2014 | Kruse | H04L 29/06197 709/228 |

* cited by examiner

REMOTE DIRECT MEMORY ACCESS IN A VIRTUALIZED COMPUTING ENVIRONMENT

BACKGROUND

Computer virtualization is a technique that involves encapsulating a physical computing machine platform into virtual machine(s) executing under control of virtualization software on a hardware computing platform or "host". A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Remote direct memory access (RDMA) is a technique that enables communication with higher throughput and lower latencies by allowing devices to read and write directly to an application's memory. RDMA uses processor-offloading and operating system-bypass methods such that the protocol processing is offloaded to RDMA peripheral devices. These capabilities have driven the popularity of RDMA in high-performance computing (HPC) applications. It is desirable to support RDMA communication between virtual machines in a virtualized computing environment to provide better performance to applications deployed in VMs.

SUMMARY

One or more embodiments include a method of managing remote direct memory access (RDMA) to a virtual computing instance including suspending locally initiated RDMA operations of the virtual computing instance executing on a first host prior to a migration of the virtual computing instance to a second host. The first host includes a first hypervisor and the second host includes a second hypervisor. The method further includes requesting a peer to suspend remotely initiated RDMA operations that target the virtual computing instance through a first channel having an RDMA transport. The method further includes establishing, after the migration, a second channel between the peer and the second hypervisor that supports execution of the virtual computing instance on the second host. The method further includes configuring a virtual object of the second hypervisor on the second host to use the second channel for the locally initiated RDMA operations. The method further includes requesting the peer to resume the remotely initiated RDMA operations using the second channel.

Further embodiments include a non-transitory computer-readable storage medium comprising instructions that cause a computer system to carry out the above method, and a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
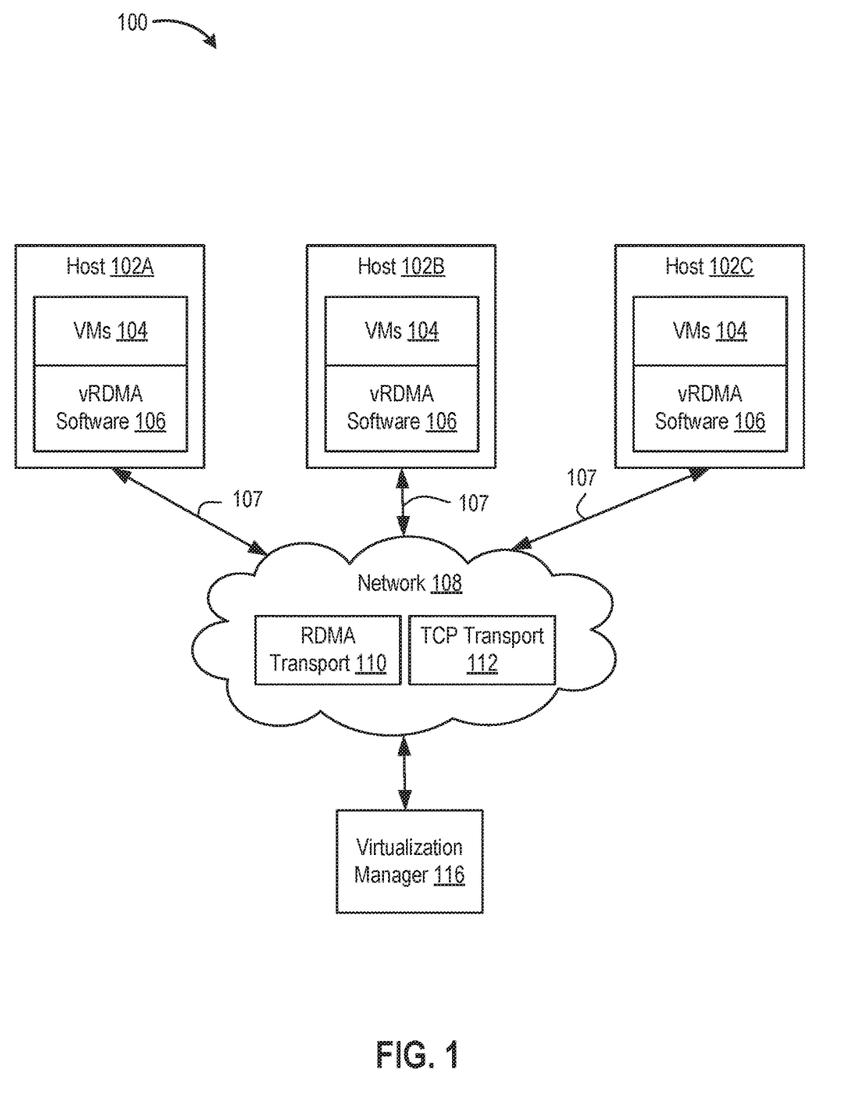
FIG. 1 is a block diagram depicting a computing system in which one or more embodiments of the present disclosure may be utilized.

FIG. 1 is a block diagram depicting a computing system 100 in which one or more embodiments of the present disclosure may be utilized. Computing system 100 includes host computers ("hosts") 102A, 102B, and 102C (collectively "hosts 102"), a network 108, and a virtualization manager 116. While three hosts 102 are shown in the example, computing system 100 can include a plurality of hosts. Each host 102 includes a network interface 107 coupled to network 108. Network 108 includes routers, switches, and the like that facilitate data link connections among hosts 102 and virtualization manager 116. The data link layer of network 108 supports a plurality of transports, including a remote direct memory access (RDMA) transport 110 and/or a transmission control protocol (TCP) transport 112. The data link layer of network 108 can support various other known transports, such as user datagram protocol (UDP) and the like. In an embodiment, the data link layer of network 108 is Ethernet. In another embodiment, RDMA transport 110 is RDMA over Converged Ethernet (RoCE). Those skilled in the art will appreciate that embodiments described herein can be used with other types of RDMA transports, such as internet Wide Area RDMA Protocol (iWARP). Network interface 107 includes functionality to support RDMA transport 110 in addition to other transports, such as TCP transport 112.

Figure 2:
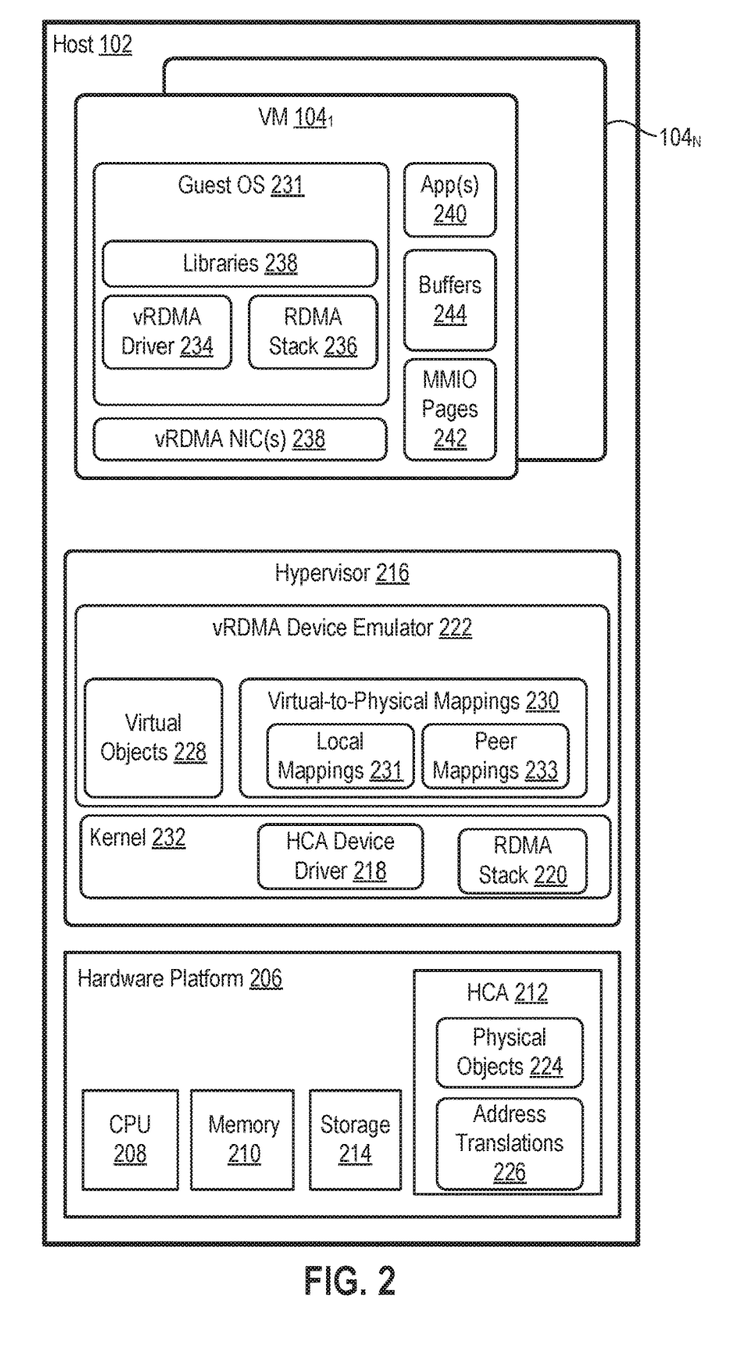
FIG. 2 is a block diagram depicting a host in which one or more embodiments of the present disclosure may be utilized.

Each host 102 comprises a computer, appliance, or the like that includes a hardware platform supporting execution of virtualization software that abstracts processor, memory, storage, and networking resources for use by one or more virtual machines (VMs) 104. An example configuration of a host 102 is shown in FIG. 2 and described below. Each host 102 further supports execution of virtual RDMA (vRDMA) software 106. vRDMA software 106 includes one or more components that abstract the RDMA functionality of network interface 107 for use by VMs 104. vRDMA software 106 allows VMs 104 to share the RDMA functionality of network interface 107, enabling virtualization of distributed workloads requiring low latency and high bandwidth provided by RDMA, such as High-Performance Computing (HPC), databases, trading systems, "big data" systems, and the like. As described herein, vRDMA software 106 exhibits low overhead while maintaining the consolidation and isolation afforded by virtualization.

Virtualization manager 116 comprises a computer, appliance, or the like that includes a hardware platform supporting execution of software for managing hosts 102 and VMs 104. Virtualization manager 116 can perform various functions, including orchestrating the migration of VMs from one host to another. vRDMA software 106 is configured to support migration of VMs 104 between hosts 102. Following migration, the connectivity between the migrated VM and its peer(s) may have changed. vRDMA software 106 is configured to reestablish RDMA connections to each peer and ensure that the migration is transparent to the RDMA-based applications of the migrated VM. In an embodiment, vRDMA software 106 reestablishes RDMA connections using the best available transport, which may include transports other than RDMA transport 110. For example, a VM may be migrated to a host that does not have a network interface with RDMA functionality. In such case, vRDMA software 106 can reestablish RDMA connections between a migrated VM and its peers using TCP transport 112. In another example, a migrated VM and a peer may be executing on the same host. In such case, vRDMA software 106 can reestablish an RDMA connection between the migrated VM and its peer using direct memory copying, which may be more efficient than RDMA communication.

FIG. 2 is a block diagram depicting a host 102 in which one or more embodiments of the present disclosure may be utilized. Host 102 may be constructed on a server grade hardware platform 206, such as an x86 architecture platform or the like. As shown, hardware platform 206 includes conventional components of a computing device, such as one or more processors (CPUs) 208, system memory 210 (also referred to as "memory 210"), a network interface (referred to as a host channel adapter (HCA) 212), storage system 214, and other I/O devices. CPU 208 is configured to execute instructions, for example, executable instructions that perform one or more operations described herein and may be stored in memory 210 and in local storage. Memory 210 is a device allowing information, such as executable instructions and data to be stored and retrieved. Memory 210 may include, for example, one or more random access memory (RAM) modules. HCA 212 enables host 102 to communicate with another device via a communication medium, such as network 108. HCA 212 includes functionality for communication using various transports, such as an RDMA transport and a TCP transport. Storage system 214 represents local storage devices (e.g., one or more hard disks, flash memory modules, solid state disks, and optical disks) and/or a storage interface that enables host 102 to communicate with one or more network data storage systems. Examples of a storage interface are a host bus adapter (HBA) that couples host 102 to one or more storage arrays, such as a SAN or a NAS, as well as other network data storage systems.

Host 102 executes virtualization software that abstracts processor, memory, storage, and networking resources of hardware platform 206 into multiple VMs 104 that run concurrently on host 102. VMs 104 run on top of virtualization software, shown as a hypervisor 216, which implements platform virtualization and enables sharing of the hardware resources of host 102 by VMs 104. One example of hypervisor 216 that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 104 supports execution of a guest operating system (OS) 231. Guest OS 231 can be any commodity operating system known in the art, such as Linux®, Microsoft Windows®, Mac OS®, or the like.

In the example shown, hypervisor 216 is a Type-1 hypervisor (also referred to as a "bare-metal hypervisor") that executes directly on hardware platform 206. In other embodiments, host 102 can include a Type-2 hypervisor (also referred to as a "hosted hypervisor") that executes on an operating system. One example of a Type-2 hypervisor that may be configured and used in embodiments described herein is VMware Workstation Pro™ made commercially available from VMware, Inc. (although it should be recognized that any other hosted hypervisor can be used consistent with the teachings herein, such as VirtualBox® or the like). The term "hypervisor" as used herein encompasses both Type-1 and Type-2 hypervisors, as well as hybrids thereof (e.g., a Kernel-based Virtual Machine (KVM) infrastructure operating on a Linux® kernel).

Hypervisor 216 includes a kernel 232 and vRDMA device emulator 222. Kernel 232 is a Portable Operating System Interface (POSIX) or POSIX-like kernel that supports execution of drivers, modules, services, and the like that virtualize hardware platform 206 for execution of VMs 104. Kernel 232 includes HCA device driver 218 that provides a software interface to HCA 212. Kernel 232 also includes RDMA stack 220 that exposes an RDMA verbs application programming interface (API). RDMA stack 220 includes an industry standard OpenFabrics Enterprise Distribution (OFED) RDMA software stack or the like.

RDMA verbs include setup verbs and datapath verbs. Applications use setup verbs to create control channels and to establish communication channels between endpoints. Applications use datapath verbs to initiate transfers between endpoints and to send and receive data to and from memory. The verbs operate on a set of RDMA primitives managed by HCA 212, including queue pairs (QPs), completion queues (CQs), and memory regions (MRs). HCA 212 manages physical objects 224, which include QPs, CQs, and MRs. HCA 212 also includes address translations 226 for accessing MRs.

QPs represent the fundamental RDMA communication channel between two endpoints. QPs include a send queue (SQ) and a receive queue (RQ). Unreliable Datagram (UD) QPs are analogous to UDP sockets, and Reliable Connection (RC) QPs are analogous to TCP sockets. Applications transfer data by enqueuing Work Requests (WRs) on QPs using datapath verbs. QPs are identified by a QP number (QPN). CQs provide a mechanism for indicating completion of WRs. HCA 212 enqueues completions when data is sent or received. An application can poll a CQ via a datapath verb or the application can optionally request for a completion to be signaled. Similar to QPs, CQs are identified by a CQ number (CQN). MRs represent the regions of memory, or buffers, that an application wishes to use for DMA. MRs are registered directly with HCA 212, which maintains address translations 226. MRs are identified by a local key (lkey) and a remote key (rkey).

RDMA stack 220 is not directly exposed to applications running in VMs 104. Rather, vRDMA device emulator 222 virtualizes RDMA stack 220 for each of VMs 104. vRDMA device emulator 222 provides RDMA verb support to each VM 104, including support for both setup and datapath verbs. vRDMA device emulator 222 maintains a set of virtual objects 228 for each vRDMA NIC 238 of VMs 104 (e.g., virtual QPs, virtual CQs, virtual MRs) and mappings between virtual objects 228 and physical objects 224 ("virtual-to-physical mappings 230"). As discussed below, each VM 104 can include one or more vRDMA NICs 238, each of which is part of the VM state. vRDMA device emulator 222 maintains separate instances for each vRDMA NIC 238 in each VM 104. vRDMA device emulator 222 forwards verbs from VMs 104 to RDMA stack 220, performing the necessary translations between virtual objects 228 and physical objects 224 (e.g., virtual QPNs to physical QPNs). When HCA 212 completes the operation of a verb, vRDMA device emulator 222 receives the response and re-translates the completion information for the VM (e.g., physical QPN to virtual QPN).

In addition, vRDMA device emulator 222 can emulate verb operations. When a host does not include an HCA, vRDMA device emulator 222 emulates RDMA verbs and primitives using another transport, such as a TCP transport. This allows applications to continue to communicate even if a physical RDMA link is unavailable. If applications are in VMs executing on the same host, vRDMA device emulator 222 can emulate RDMA verbs and primitives using memory copying operations (memcpy). In general, vRDMA device emulator 222 selects between three different transports based on the endpoints: vRDMA-over-memcpy for host-local peers; vRDMA-over-RDMA for peers on a physical RDMA network; and vRDMA-over-TCP for remaining peers.

Each VM 104 includes a guest OS 231, one or more applications 240, and one or more vRDMA network interface cards (NICs) 238. vRDMA NIC 238 is a virtual network device provided to VM 104 by hypervisor 216. In an embodiment, vRDMA NIC 238 is a virtual Peripheral Component Interface Express (PCIe) device. vRDMA NIC 238 interfaces with vRDMA device emulator 222. Guest OS 231 can be any commodity operating system, such as Linux®, Microsoft Windows®, or the like. For some RDMA operations, application(s) 240 interface with guest OS 231, which in turn interfaces with vRDMA NIC 238 (e.g., setup operations). For other RDMA operations, such as datapath operations, application(s) 240 directly interface with vRDMA NIC 238. Application(s) 240 establish buffers 244 to store data to be transferred and data to be received.

Guest OS 231 includes libraries 238, vRDMA driver 234, and the standard OFED RDMA stack 236. Libraries 238 can include user-space and kernel-space libraries that cooperate with RDMA stack 236 to expose the RDMA verbs API to application(s) 240 and guest OS 231. vRDMA driver 234 provides a software interface to vRDMA NIC 238. vRDMA driver 234 interacts with vRDMA NIC 238 at the virtual hardware level via Base Address Registers (BARs) and memory mapped input/output (MMIO) pages (e.g., MMIO pages 242) to communicate with vRDMA device emulator 222.

The vRDMA software implements both OS-bypass and zero-copy features. For OS-bypass, each application 240 has direct access to vRDMA NIC 238 for datapath verbs using its own MMIO page(s) 242. Each MMIO page 242 can include doorbells, which are specific areas in the page that indicate the different datapath verbs. When application 240 invokes a given datapath verb, libraries 238 write to the corresponding doorbell in the MMIO page allocated to the application. vRDMA device emulator 222 traps writes to the doorbells to receive and process the datapath verbs. Thus, RDMA datapath operations bypass guest OS 231 and RDMA stack 236.

Buffers 244 are assigned virtual addresses within the address space of application(s) 240 (e.g., guest virtual addresses). HCA 212 transfers data to/from buffers 244 using DMA. HCA 212 includes address translations 226 in order to translate between the virtual addresses and machine memory addresses in order to perform the DMA operations. RDMA stack 220 exposes an API to vRDMA device emulator 222 for registering guest virtual addresses directly with HCA 212.

Figure 3:
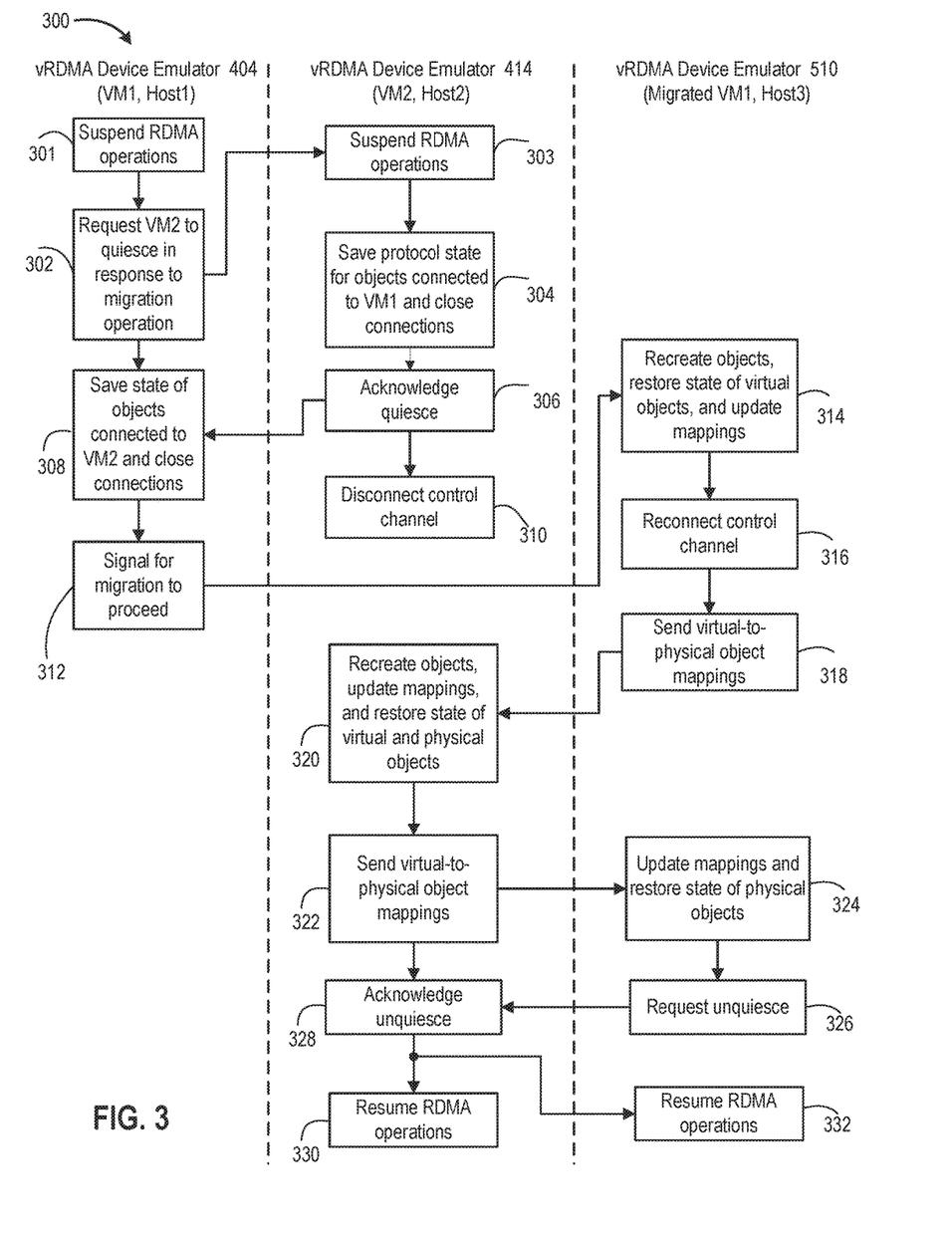
FIG. 3 is a flow diagram depicting a method of managing remote direct memory access (RDMA) operations in response to migration of a virtual machine (VM) according to an embodiment.
Figure 4:
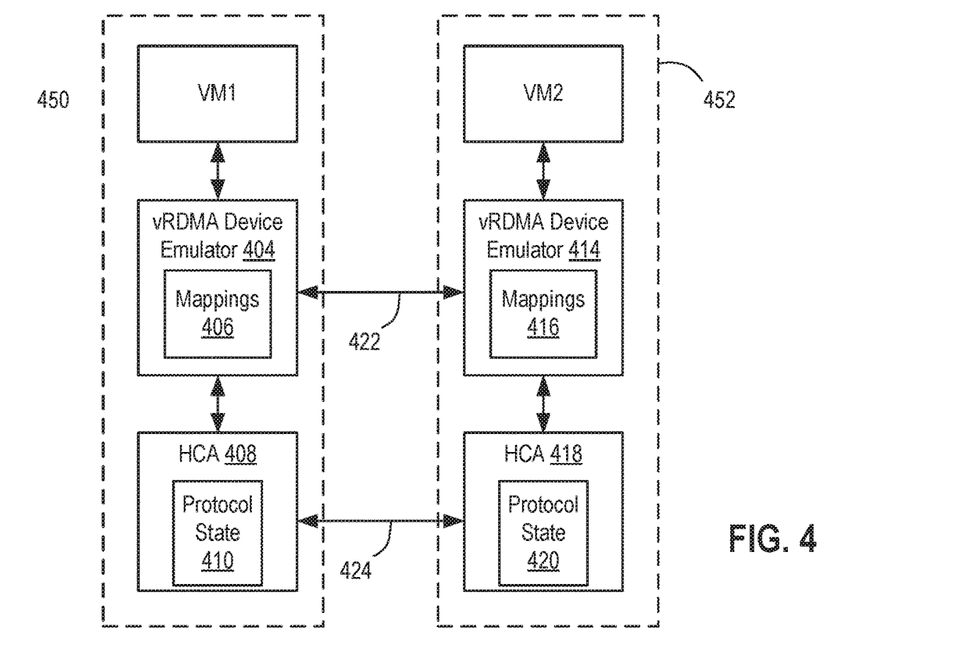
FIG. 4 is a block diagram depicting communication between VMs prior to migration.
Figure 5:
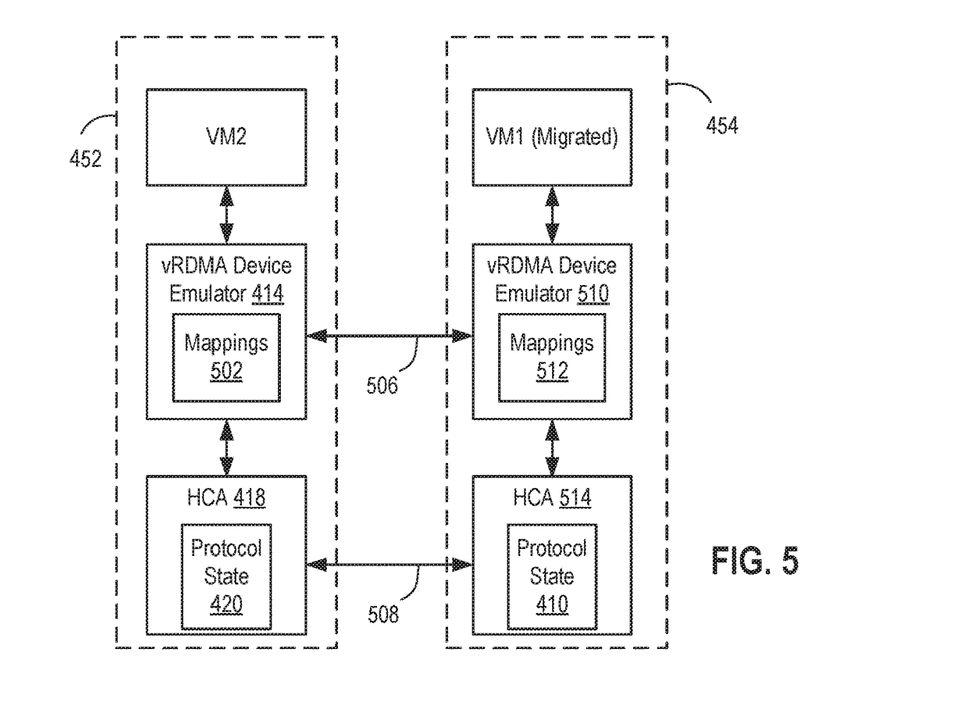
FIG. 5 is a block diagram depicting communication between VMs after migration.

FIG. 3 is a flow diagram depicting a method 300 of managing RDMA operations in response to migration of a VM according to an embodiment. Method 300 includes steps performed by a plurality of hypervisors, in particular, a plurality of instances of vRDMA device emulator 222. In the present example, method 300 relates a first VM (VM1) in a first host (host1) communicating with a second VM (VM2) in a second host (host2) as an RDMA peer. VM1 is being migrated from host1 to a third host (host3). FIG. 4 is a block diagram depicting communication between VM1 and VM2 prior to migration of VM1 and FIG. 5 is a block diagram depicting communication between VM1 and VM2 after migration of VM1.

As shown in FIG. 4, VM1 is executing in a host 450 (host1) and VM2 is executing in a host 452 (host2). Host 450 includes a hypervisor configured with a vRDMA device emulator 404 and host 452 includes a hypervisor configured with a vRDMA device emulator 414. Host 450 includes an HCA 408 and host 452 includes an HCA 418. HCA 408 is managing physical objects (e.g., QPs, CQs, MRs) having a protocol state 410. HCA 418 is managing physical objects having a protocol state 420. Protocol state 410, 420 can include various RDMA protocol state information that is exposed to the VMs, such as packet sequence numbers (PSNs). vRDMA device emulator 404 includes mappings 406 of virtual objects to physical objects, and vRDMA device emulator 414 includes mappings 416 of virtual objects to physical objects. vRDMA device emulator 404 communicates with vRDMA device emulator 414 over a control channel 422 (e.g., a TCP channel). HCA 408 communicates with HCA 418 over an RDMA channel 424. As shown in FIG. 5, VM2 is executing in host 452 as described above in FIG. 4. VM1 is migrated to a host 454 having a vRDMA device emulator 510 and an HCA 514.

Returning to FIG. 3, at step 301, vRDMA device emulator 404 suspends RDMA operations for VM1. In order to migrate VM1 without loss of information, both sides of RDMA channel 424 must be brought into a consistent transport-independent state. At any given time, there can be a number of RDMA operations queued by HCA 408. The state of these operations is not visible to VM1, so vRDMA device emulator 404 suspends new operations and allows pending operations to complete. At step 302, vRDMA device emulator 404 sends a request to vRDMA device emulator 414 to have VM2 quiesce RDMA operations in response to a pending migration operation.

At step 303, vRDMA device emulator 414 suspends RDMA operations of VM2 that target VM1. vRDMA device emulator 414 suspends new operations from VM2 that target VM1 and allows pending operations to complete. At step 304, once all pending operations have completed, vRDMA device emulator 414 saves protocol state 420 and closes connections to VM1 through RDMA channel 424. At step 306, vRDMA device emulator 414 acknowledges the quiescence to vRDMA device emulator 404. At step 310, vRDMA device emulator 414 closes connections to vRDMA device emulator 404 over control channel 422.

At step 308, vRDMA device emulator 404 saves protocol state 410 and closes connections over RDMA channel 424. At step 312, vRDMA device emulator 404 signals for the migration to proceed.

At step 314, after migration, vRDMA device emulator 510 recreates its virtual objects 228 (FIG. 2), as well as physical objects on HCA 514, and restores protocol state 410 to the virtual objects. However, when recreating the physical objects, the newly created objects (e.g., QPs, CQs, MRs) can have different identifiers than prior to the migration. Thus, vRDMA device emulator 510 will have new mappings 512 that map virtual objects to physical objects. At step 316, vRDMA device emulator 510 recreates a control channel 506 with vRDMA device emulator 414. At step 318, vRDMA device emulator 510 sends mappings 512 to vRDMA device emulator 414.

At step 320, vRDMA device emulator 414 recreates its virtual objects 228 (FIG. 2), as well as the physical objects on HCA 418, and restores protocol state 420 to the virtual objects and physical objects. In addition, vRDMA device emulator 414 creates new mappings 502 that map virtual objects to physical objects. At step 322, vRDMA device emulator 414 sends mappings 502 to vRDMA device emulator 510. At step 324, vRDMA device emulator 510 updates mappings 512 and restores protocol state 410 to the physical objects on HCA 514. Once the protocol state 410, 420 is restored by both vRDMA device emulators 414, 510 the RDMA channel 508 is established between HCA 514 and HCA 418. At step 326, vRDMA device emulator 510 requests that vRDMA device emulator 414 unquiesce. At step 328, vRDMA device emulator 414 acknowledges the unquiesce to vRDMA device emulator 510. At step 332, vRDMA device emulator 510 directs VM1 to resume RDMA operations. At step 330, vRDMA device emulator 414 directs VM2 to resume RDMA operations. In this manner, VM1 and VM2 will continue their RDMA operations with little or no interruption and without data loss. From the perspective of RDMA operations, neither VM1 nor VM2 will be aware of the migration.

Figure 6:
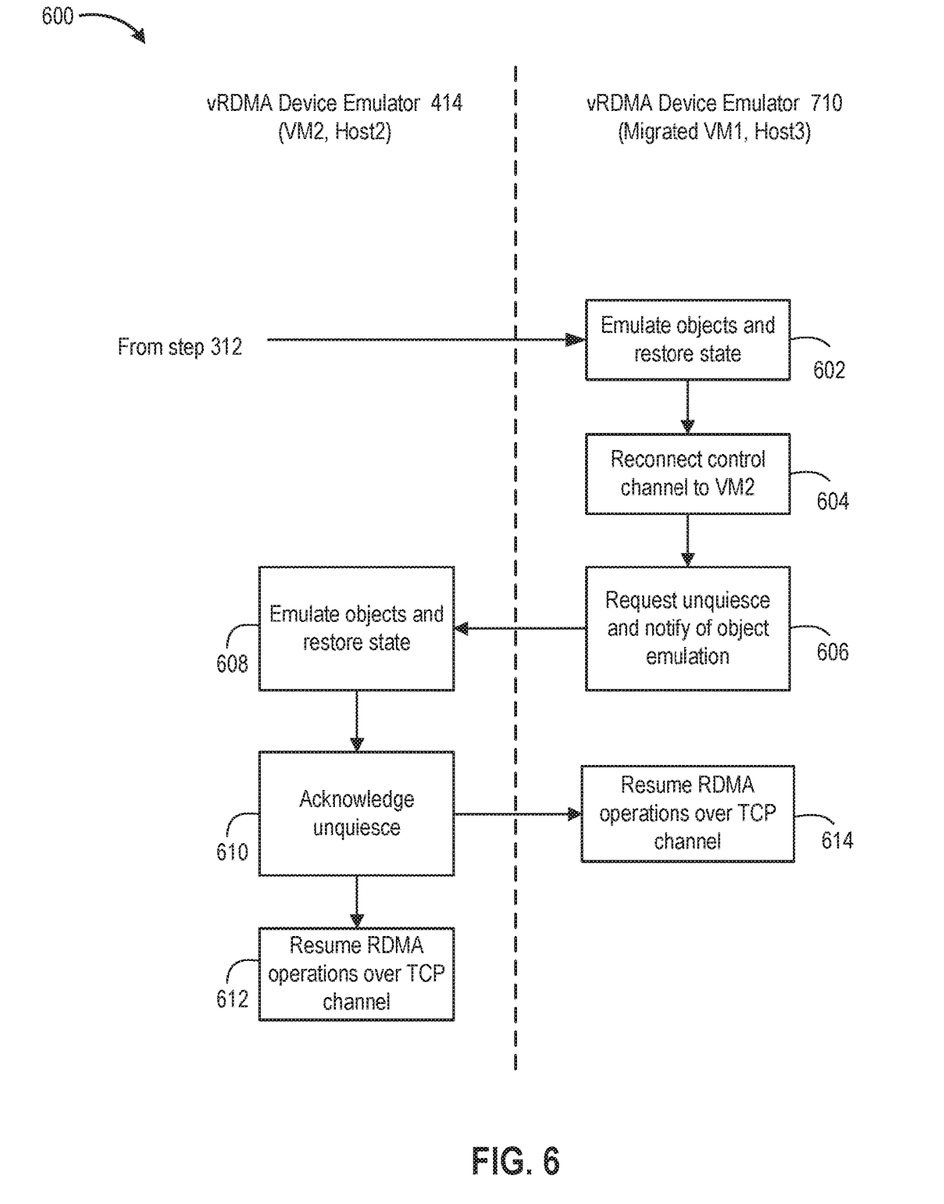
FIG. 6 is a flow diagram depicting a method of resuming RDMA communication between a migrated VM and its peer over a TCP transport.
Figure 7:
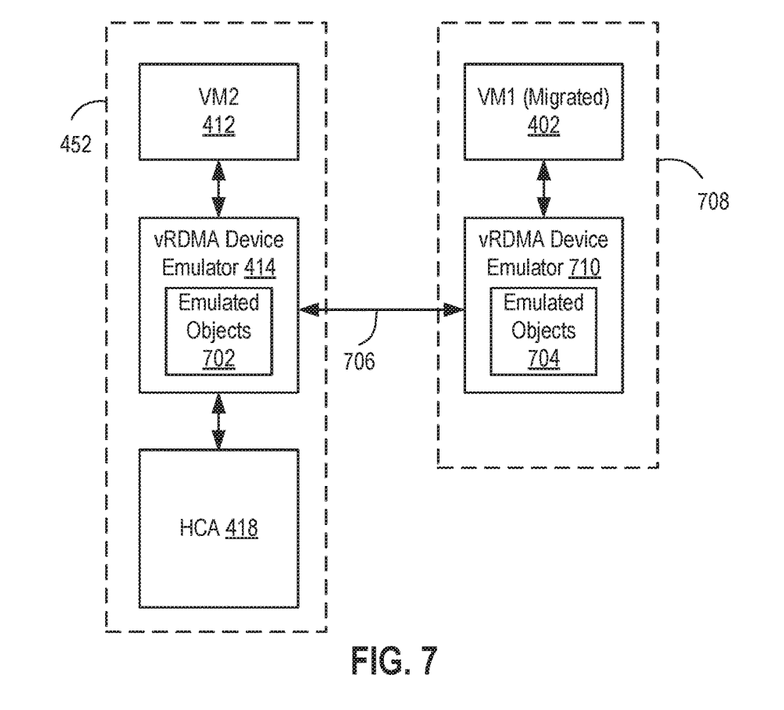
FIG. 7 is a block diagram depicting communication between VMs after migration of a VM to a host that does not include RDMA capabilities.

FIG. 3 shows the case where VM1 is being migrated to a host that includes an HCA capable of RDMA communication. In some cases, VM1 may be migrated to a host that does not have an HCA capable of RDMA communication. FIG. 6 is a flow diagram depicting a method 600 of resuming RDMA communication between a migrated VM and its peer over a TCP transport. FIG. 7 is a block diagram depicting communication between VM1 and VM2 after migration of VM1 to a host 708 that does not include an HCA capable of RDMA communication.

Referring to FIGS. 6-7, method 300 is performed through step 312. Method 600 begins after step 312 at step 602, where vRDMA device emulator 710 in host 708 emulates physical objects of an HCA and restores protocol state 410 thereto (emulated objects 704). Since vRDMA device emulator 710 is emulating the physical objects, vRDMA device emulator 710 can maintain the same identifiers used prior to migration (e.g., the same QPNs, CQNs, MR keys). Thus, vRDMA device emulator 710 does not need to create or change any virtual-to-physical object mappings. At step 604, vRDMA device emulator 710 recreates a control channel 706 (TCP channel 706) with vRDMA device emulator 414. At step 606, vRDMA device emulator 710 requests vRDMA device emulator 414 to unquiesce and notifies vRDMA device emulator 414 of the physical object emulation.

At step 608, vRDMA device emulator 414 emulates physical objects of HCA 418 and restores protocol state 420 (from FIG. 4) thereto. vRDMA device emulator 414 can maintain the same identifiers used prior to migration (e.g., the same QPNs, CQNs, MR keys). Thus, vRDMA device emulator 414 does not need to update virtual-to-physical object mappings. At step 610, vRDMA device emulator 414 acknowledges the unquiescence to vRDMA device emulator 710. At step 614, vRDMA device emulator 710 directs VM1 to resume RDMA operations, which will occur over TCP channel 706. At step 612, vRDMA device emulator 414 directs VM2 to resume RDMA operations, which will occur over TCP channel 706. The use of TCP channel 706 for RDMA communications is transparent to VM1 and VM2. In this manner, even if VM1 is migrated to a host that is not capable of RDMA communications, the RDMA operations between VM1 and VM2 will resume after the migration.

Figure 8:
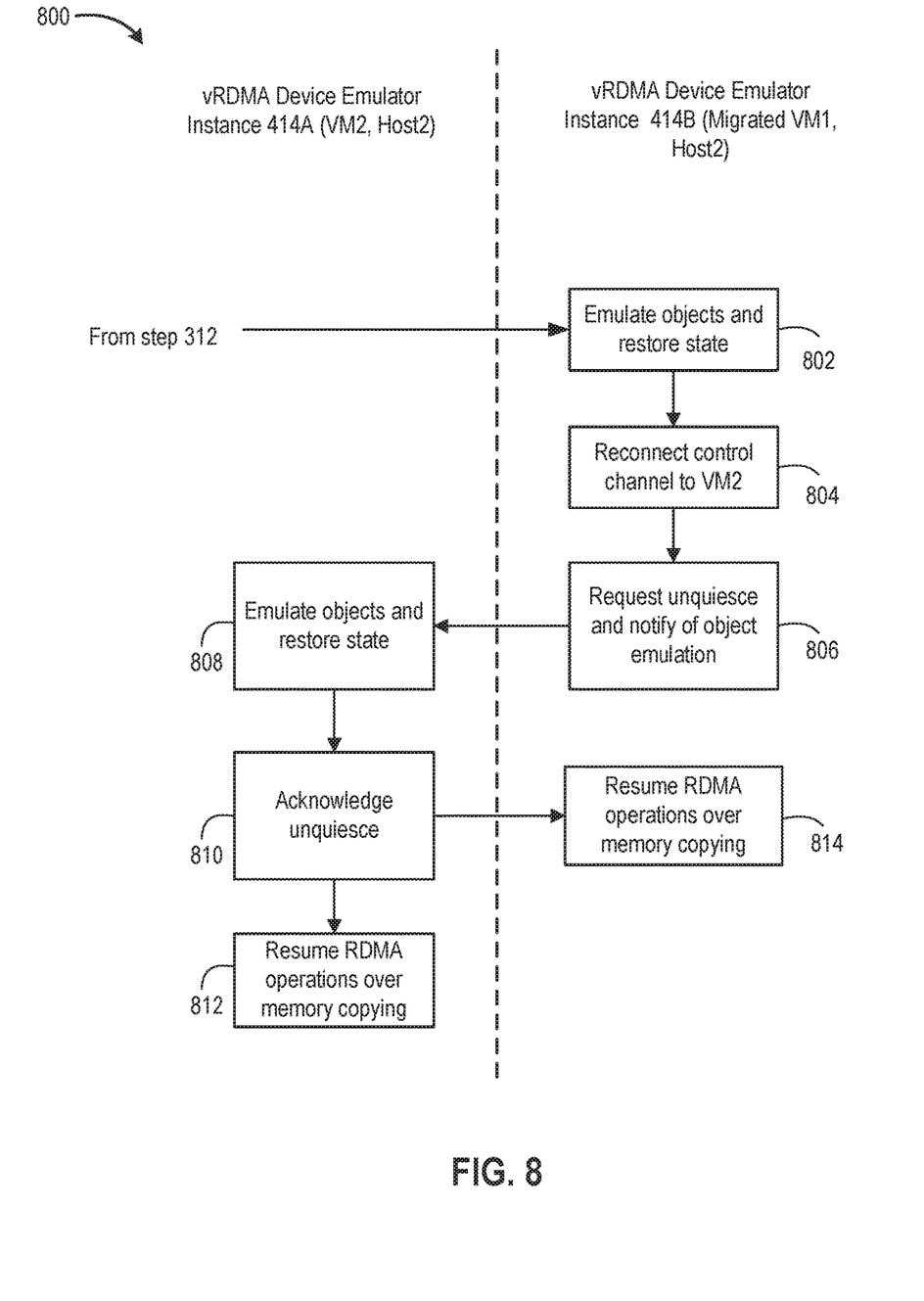
FIG. 8 is a flow diagram depicting a method of resuming RDMA communication between a migrated VM and its peer using memory copying.
Figure 9:
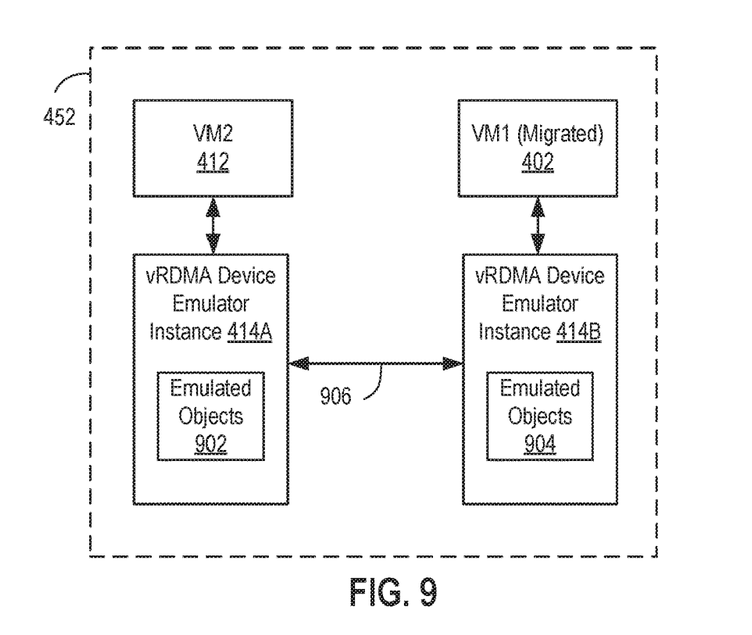
FIG. 9 is a block diagram depicting communication between VMs after migration to a common host.

In some cases, VM1 may be migrated to the same host as its peer. FIG. 8 is a flow diagram depicting a method 800 of resuming RDMA communication between a migrated VM and its peer using memory copy. FIG. 9 is a block diagram depicting communication between VM1 and VM2 after migration of VM1 to host 452. Referring to FIGS. 8-9, method 300 is performed through step 312. Method 800 begins after step 312 at step 802, where an instance of vRDMA device emulator created in host 452 for a vRDMA NIC in VM1 (referred to as vRDMA device emulator instance 414B) emulates physical objects of an HCA and restores protocol state 410 thereto (emulated objects 904). Since vRDMA device emulator instance 414B is emulating the physical objects, vRDMA device emulator instance 414B can maintain the same identifiers used prior to migration (e.g., the same QPNs, CQNs, MR keys). Thus, vRDMA device emulator instance 414B does not need to create or change any virtual-to-physical object mappings. At step 804, vRDMA device emulator instance 414B recreates a control channel 906. At step 806, vRDMA device emulator instance 414B requests an instance of vRDMA device emulator created in host 452 for a vRDMA NIC in VM2 (referred to as vRDMA device emulator instance 414A) to unquiesce and notifies vRDMA device emulator instance 414B of the physical object emulation.

At step 808, vRDMA device emulator instance 414A emulates physical objects of HCA 418 and restores protocol state 420 (from FIG. 4) thereto. vRDMA device emulator instance 414A can maintain the same identifiers used prior to migration (e.g., the same QPNs, CQNs, MR keys). Thus, vRDMA device emulator instance 414A does not need to update virtual-to-physical object mappings. At step 810, vRDMA device emulator instance 414A acknowledges the unquiescence. At step 814, vRDMA device emulator instance 414B directs VM1 to resume RDMA operations, which will occur using memory copying. At step 812, vRDMA device emulator instance 414A directs VM2 to resume RDMA operations, which will occur using memory copying. The use of memory copying for RDMA communications is transparent to VM1 and VM2. In this manner, the efficiency of communication between VM1 and VM2 can be increased in such cases by using intra-memory data transfers rather than RDMA transport.

In the example method 300 of FIG. 3, a first VM (VM1) executes in a first host (host1) and communicates with a second VM (VM2) in a second host (host2) as an RDMA peer. In another embodiment, prior to the migration of VM1 from host1 to the third host (host3), VM2 can be executing on the first host with VM1. In such an embodiment, there is no second host (host2) and only the first host (host1) and the third host (host3). Also, in such an embodiment, the RDMA operations between VM1 and VM2 can occur using memory copy operations, as described above with respect to FIGS. 8 and 9. Thus, prior to migration, the RDMA operations between VM1 and VM2 occur using memory copy operations in host1. After migration, the RDMA operations between VM1 and VM2 occur over an RDMA channel or over a TCP channel, as described above in FIGS. 3 and 6.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user-space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data that can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing remote direct memory access (RDMA) to a virtual computing instance, comprising:
    suspending locally initiated RDMA operations of the virtual computing instance executing on a first host in response to initiation of a migration of the virtual computing instance to a second host, the first host including a first hypervisor and the second host including a second hypervisor;

requesting a peer to suspend remotely initiated RDMA operations that target, through a first set of channels, the virtual computing instance, wherein the peer is executing on a third host, the third host including a third hypervisor;

determining whether the second host comprises a first host channel adapter (HCA) that is capable of RDMA communication;

after the migration of the virtual computing instance to the second host, establishing a second set of channels between the peer and the virtual computing instance, wherein:
  if the second host comprises the first HCA that is capable of RDMA communication, then the second set of channels comprises (a) a first channel between the second hypervisor and the third hypervisor, and (b) a second channel between the first HCA and a second HCA of the third host;
  if the second host does not comprise the first HCA that is capable of RDMA communication, then the second set of channels comprises a first channel between the second hypervisor and the third hypervisor, and does not comprise a second channel between the first HCA and the second HCA of the third host;

configuring a virtual object of the second hypervisor on the second host to use the first channel for the locally initiated RDMA operations; and requesting the peer to resume the remotely initiated RDMA operations using the second set of channels.

2. The method of claim 1, wherein the step of suspending the locally initiated RDMA operations comprises:
  quiescing a first RDMA physical object on the first host, the first RDMA physical object being an endpoint of the first channel and being mapped to the virtual object prior to the migration.

3. The method of claim 2, further comprising:
  saving state of the first RDMA physical object prior to the migration;
  wherein the second set of channels uses an RDMA transport;
  wherein the step of establishing the second set of channels comprises:
    creating a second RDMA physical object on the second host after the migration, the second RDMA physical object being an endpoint of the second set of channels; and
    restoring the state to the second RDMA physical object; and
  wherein the step of configuring the virtual object comprises:
    mapping the virtual object to the second RDMA physical object.

4. The method of claim 3, further comprising:
  sending information indicative of a mapping between the virtual object and the second RDMA physical object to the peer.

5. The method of claim 4, wherein the peer comprises a remote host having a remote hypervisor supporting execution of a remote virtual computing instance, and wherein the method further comprises:
  receiving, at the second hypervisor in the second host, information indicative of a mapping between a remote virtual object used by the remote virtual computing instance and a remote RDMA physical object on the remote host.

6. The method of claim 5, further comprising:
  establishing, after the migration, a control channel between the second hypervisor in the second host and the remote hypervisor;
  wherein the information indicative of the mappings between the virtual object and the second RDMA physical object, and between the remote virtual object and the remote RDMA physical object, are exchanged between the second hypervisor and the remote hypervisor over the control channel.

7. The method of claim 4, wherein the second RDMA physical object comprises a queue pair, and wherein the information indicative of the mapping between the virtual object and the second RDMA physical object comprises a relation between a queue pair number (QPN) of the queue pair and a virtual QPN of the virtual object.

8. The method of claim 7, wherein the second RDMA physical object further comprises a physical memory region key, and wherein the information indicative of the mapping between the virtual object and the second RDMA physical object comprises a relation between the physical memory region key and a virtual memory region key of the virtual object.

9. The method of claim 1, wherein the second set of channels uses a transmission control protocol (TCP) transport.

10. The method of claim 1, wherein the peer comprises another virtual computing instance executing on the second host and supported by the second hypervisor on the second host, and wherein the second set of channels is implemented at least in part using memory copy operations.

11. The method of claim 1, wherein the peer comprises another virtual computing instance executing on the first host and supported by the first hypervisor on the first host, and wherein the first set of channels is implemented at least in part using memory copying operations.

12. A non-transitory computer readable medium having instructions stored thereon that when executed by a processor cause the processor to perform a method of managing remote direct memory access (RDMA) to a virtual computing instance, comprising:
  suspending locally initiated RDMA operations of the virtual computing instance executing on a first host in response to initiation of a migration of the virtual computing instance to a second host, the first host including a first hypervisor and the second host including a second hypervisor;
  requesting a peer to suspend remotely initiated RDMA operations that target, through a first set of channels, the virtual computing instance, wherein the peer is executing on a third host, the third host including a third hypervisor;
  determining whether the second host comprises a first host channel adapter (HCA) that is capable of RDMA communication;
  after the migration of the virtual computing instance to the second host, establishing a second set of channels between the peer and the virtual computing instance, wherein:
    if the second host comprises the first HCA that is capable of RDMA communication, then the second set of channels comprises (a) a first channel between the second hypervisor and the third hypervisor, and (b) a second channel between the first HCA and a second HCA of the third host;
if the second host does not comprise the first HCA that is capable of RDMA communication, then the second set of channels comprises a first channel between the second hypervisor and the third hypervisor, and does not comprise a second channel between the first HCA and the second HCA of the third host;
configuring a virtual object of the second hypervisor on the second host to use the first channel for the locally initiated RDMA operations; and
requesting the peer to resume the remotely initiated RDMA operations using the second set of channels.

13. The non-transitory computer readable medium of claim 12, wherein the step of suspending the locally initiated RDMA operations comprises:
quiescing a first RDMA physical object on the first host, the first RDMA physical object being an endpoint of the first channel and being mapped to the virtual object prior to the migration.

14. The non-transitory computer readable medium of claim 13, further comprising:
saving state of the first RDMA physical object prior to the migration;
wherein the second set of channels uses an RDMA transport;
wherein the step of establishing the second set of channels comprises:
creating a second RDMA physical object on the second host after the migration, the second RDMA physical object being an endpoint of the second set of channels; and
restoring the state to the second RDMA physical object; and
wherein the step of configuring the virtual object comprises:
mapping the virtual object to the second RDMA physical object.

15. The non-transitory computer readable medium of claim 14, further comprising:
sending information indicative of a mapping between the virtual object and the second RDMA physical object to the peer.

16. The non-transitory computer readable medium of claim 15, wherein the peer comprises a remote host having a remote hypervisor supporting execution of a remote virtual computing instance, and wherein the method further comprises:
receiving, at the second hypervisor in the second host, information indicative of a mapping between a remote virtual object used by the remote virtual computing instance and a remote RDMA physical object on the remote host.

17. The non-transitory computer readable medium of claim 16, further comprising:
establishing, after the migration, a control channel between the second hypervisor in the second host and the remote hypervisor;
wherein the information indicative of the mappings between the virtual object and the second RDMA physical object, and between the remote virtual object and the remote RDMA physical object, are exchanged between the second hypervisor and the remote hypervisor over the control channel.

18. The non-transitory computer readable medium of claim 15, wherein the second RDMA physical object comprises a queue pair, and wherein the information indicative of the mapping between the virtual object and the second RDMA physical object comprises a relation between a queue pair number (QPN) of the queue pair and a virtual QPN of the virtual object.

19. The non-transitory computer readable medium of claim 15, wherein the second RDMA physical object further comprises a physical memory region key, and wherein the information indicative of the mapping between the virtual object and the second RDMA physical object comprises a relation between the physical memory region key and a virtual memory region key of the virtual object.

20. The non-transitory computer readable medium of claim 12, wherein the second set of channels uses a transmission control protocol (TCP) transport.

21. The non-transitory computer readable medium of claim 12, wherein the peer comprises another virtual computing instance executing on the second host and supported by the second hypervisor on the second host, and wherein the second set of channels is implemented at least in part using memory copy operations.

22. The non-transitory computer readable medium of claim 12, wherein the peer comprises another virtual computing instance executing on the first host and supported by the first hypervisor on the first host, and wherein the first set of channels is implemented at least in part using memory copying operations.

23. A computer system, comprising:
a first host computer having a first hardware platform and a first hypervisor executing on the first hardware platform; and
a second host computer having a second hardware platform and a second hypervisor executing on the second hardware platform;
a third host computer having a third hardware platform and a third hypervisor executing on the third hardware platform; and
wherein the first hypervisor supports execution of a virtual computing instance and is configured to:
suspend local remote direct memory access (RDMA) operations of the virtual computing instance in response to initiation of a migration of the virtual computing instance to the second host; and
request a peer to suspend remotely initiated RDMA operations that target, through a first set of channels, the virtual computing instance, wherein the peer is executing on the third host;
wherein the second hypervisor is configured to:
determine whether the second host comprises a first host channel adapter (HCA) that is capable of RDMA communication;
after the migration of the virtual computing instance to the second host, establish a second set of channels between the peer and the virtual computing instance, wherein:
if the second host comprises the first HCA that is capable of RDMA communication, then the second set of channels comprises (a) a first channel between the second hypervisor and the third hypervisor, and (b) a second channel between the first HCA and a second HCA of the third host;
if the second host does not comprise the first HCA that is capable of RDMA communication, then the second set of channels comprises a first channel between the second hypervisor and the third hypervisor, and does not comprise a second channel between the first HCA and the second HCA of the third host;
configure a virtual object of the second hypervisor to use the first channel for the locally initiated RDMA operations; and
request the peer to resume the remotely initiated RDMA operations using the second set of channels.

24. The computer system of claim 23, wherein the second channel uses a transport different from an RDMA transport.

* * * * *